(No Model.)
W. C. BRADFORD.
WHEELED DUMPING SCRAPER AND GRADER.
No. 603,421. Patented May 3, 1898.
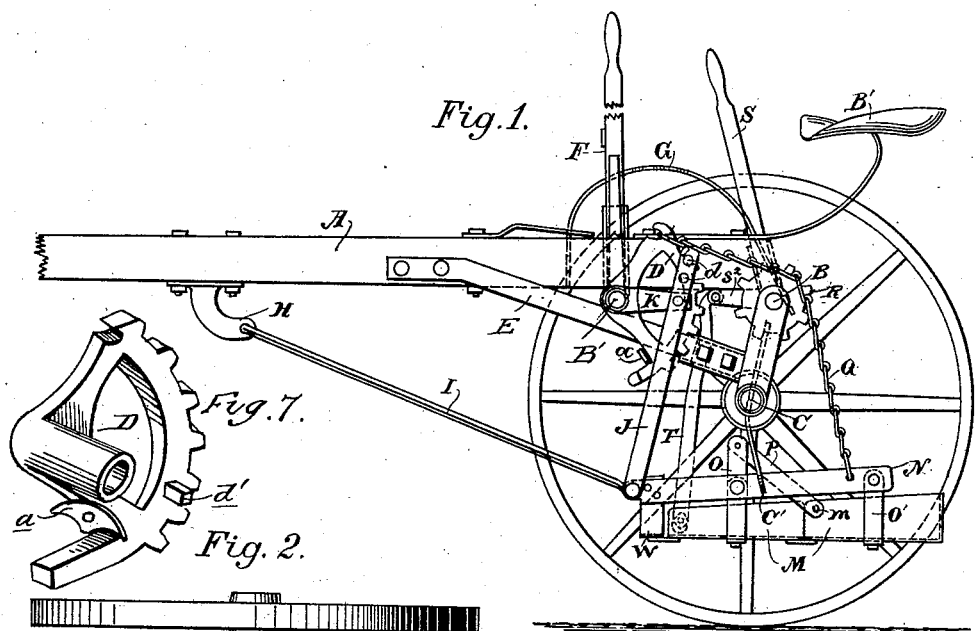
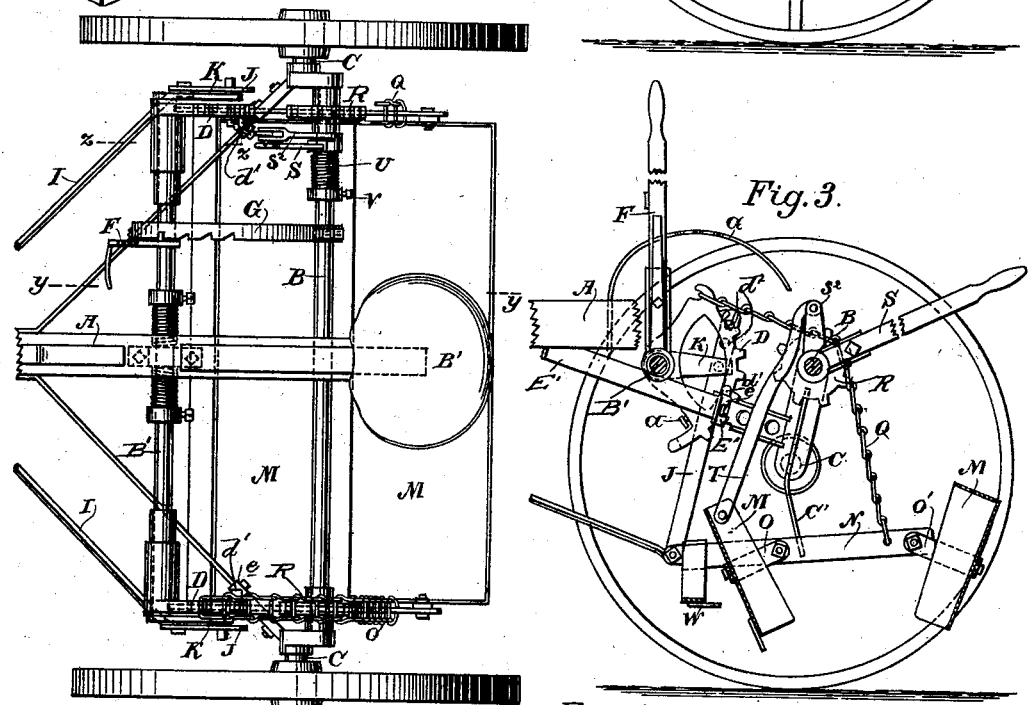
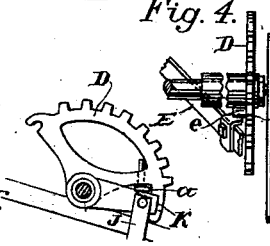
Witnesses,
Inventor,
Walter C. Bradford
By Dewey & Co.
Atty

UNITED STATES PATENT OFFICE.

WALTER C. BRADFORD, OF ARBUCKLE, CALIFORNIA.

WHEELED DUMPING SCRAPER AND GRADER.

SPECIFICATION forming part of Letters Patent No. 603,421, dated May 3, 1898.

Application filed June 18, 1897. Serial No. 641,242. (No model.)

*To all whom it may concern:*

Be it known that I, WALTER C. BRADFORD, a citizen of the United States, residing at Arbuckle, county of Colusa, State of California, have invented an Improvement in Wheeled Dumping Scrapers and Graders; and I hereby declare the following to be a full, clear, and exact description of the same.

My invention relates to certain improvements in that class of machines known as "wheeled dumping-scrapers."

The object of my invention is to provide means whereby the act of emptying the pan of the machine is facilitated and also whereby the pan can be raised or lowered, so as to be adapted to the work of a grader as well as a scraper, the whole being under the control of the operator or driver of the machine.

Referring to the accompanying drawings, Figure 1 is a side elevation with near wheel removed. Fig. 2 is a plan. Fig. 3 is a vertical section through $y$ $y$ of Fig. 2. Figs. 4, 5, 6, and 7 are details.

In said drawings, A is the beam or pole.

B is a crank-shaft having short axles C, which carry the bearing-wheels.

The axles C carry the guide-bars C', extending below the side bars N of the frame L, hereinafter described, and prevent such frame from swinging too far laterally.

In front of the shaft B is a second shaft B', to which are fixed the arms K, and to the latter are adjustably attached, by means of a pin and series of holes, the links or hangers J, the lower ends of which are attached to the front ends of the side bars N, which carry the pan M, whereby upon operating a lever F on the shaft B' the front of the scraper is raised or lowered, as desired. On the shaft B' are loosely-mounted sprocket-segments D, one of which is shown in detail in Fig. 7, said segments having lugs $d'$ on their sides adapted to contact with stops $e$ on the brace E E', as shown in Figs. 4 and 5, which limit the downward movement of said segments.

To the shaft B is fixed the lever F, which is adapted to engage the segmental rack G in the usual manner to hold the lever and the shaft B' at any desired point.

On the bottom of the beam A and toward its front end the hook H is bolted. Through this hook the bight of a diverging brace-rod I passes. Its rear ends terminate in eyes which are pivoted to the suspending-links J, the upper ends of which links are connected with the cranks K on the shaft B', to which they are rigidly connected exteriorly to the said sprocket-segments.

The links J are provided at the upper ends with two or more holes, through any pair of which they may be pivoted to the arms K, thus lengthening or shortening them and so diminishing or increasing the distance of the suspended pan M from the ground.

A frame is placed between the wheels of the machine and adapted to hold the pan M. This frame is composed of the side bars N and the cross-bars O and O', having their ends bent up at right angles and pivoted to the said side bars, the front ends of which are pivoted to the brace-rod I, which prevents the frame and the connected pan from swinging backward.

The pan M is divided into two equal parts, which are fixed to the cross-bars O and O', respectively. One end of the cross-bar O is extended and terminates in an eye to which is pivoted the forked link P, pivoted at its forked end to the adjacent side of the rearward portion of the pan M, as shown at $m$.

The sprocket-chains Q are fastened to the rear ends of the side bars N and pass over the sprocket-wheels R, which turn loosely on either end of the axle B, the other ends of the said chains being adjustably attached to the forward ends of the sprocket-segments D, with the teeth of which they also engage.

The lever S is loosely fulcrumed on the axle B and provided with the arm $s^2$, from which the link T extends down and is pivoted to the forward end of the adjacent side of the pan M.

U is a coiled spring wrapped around the axle B adjacent to the lever S and held in place by the collar V.

To the forward ends of the side bars N the cutter or scraper W is fixed, as shown. This scraper is placed in the same plane as the pan M and has its inner edge beveled, so that the forward portion of the pan M may pass over it when raised by the action of the lever S; but when the pan is in its normal position its front edge is in the plane of the scraper or cutter W, and the soil excavated thereby will pass directly to the pan.

In operating my improved dumping-scraper the lever F is thrown back, thus turning the shaft B' and the crank-arms K and lowering the links J and with them the pan M until it is in position to become loaded, when the machine is drawn over the ground. When the pan is thus loaded, the lever F is then pushed forward into engagement with a notch on the rack G, and the loaded pan is thereby raised to a suitable elevation above the surface. The machine is then moved to the dumping-ground, when the operator pulls back the lever S, the action of which separates the two portions of the pan M by raising the link T, so as to tilt the forward part of the pan, and this acts through the arm P to in like manner lift the rear portion. The load falls through the aperture thus formed, and as soon as it is discharged the operator lets go of the lever S, which is returned to its normal position by means of the coiled spring U, and simultaneously the two portions of the pan fall together again, and the machine is ready to be taken back for the next load.

When it is desired to use the machine as a grader, the buttons which are pivoted to the lower ends of the sprocket-segments are turned above the crank-arms K, so as to be supported upon them, and through the links J and the chains Q, passing over the segments, the whole pan is correspondingly raised bodily to a suitable height for a grader, after which the levers F and S may be used, as previously explained.

The rear of the pan is raised by turning the sprocket-segments until the pivoted latches $a$ (see Fig. 7) upon the lower ends of the segments are raised above the rocker-arms K. The latches are then turned so as to engage the arms, and thus hold the pan in position for grading irregular surfaces.

Having thus described my invention, what I claim as new, and desire to secure by Letters Patent, is—

1. A wheeled dumping-scraper having a bisected pan fastened to a frame carrying a scraper or cutter at its forward end, a spring-pressed lever fulcrumed on the axle of the machine and connected with the forward portion of the pan by a link, and jointed arms connecting the rear and front portions of the pan, a shaft journaled on the machine forward of and parallel to its axle, crank-levers fixed to each end of said shaft and connected with the pan-frame, a spring-pressed lever rigidly fastened to said shaft to raise and depress the front of the pan, and curved segments turnable upon the shaft with chains passing therefrom over guide-pinions to the rear portion of the pan-frame.

2. A wheeled dumping-grader having a bisected pan secured to a containing-frame carrying a scraper or cutter, a spring-pressed lever fulcrumed to the axle of the machine, and having a link connection with the forward portion of the pan, sprocket-wheels on each end of said axle, a shaft journaled on said machine in front of and parallel to said axle, sprocket-segments on said shaft in line with said sprocket-wheels and provided with lugs near their rear ends, chains fastened to the rear ends of said pan-frame and passing over and engaging the teeth of said sprocket wheels and segments, a spring-controlled handle-bar or lever fulcrumed to said shaft and engaging with a curved notched rack fastened in front of said shaft and extending backward to said axle, cranks and links connecting with the shaft and the forward ends of the pan-frame, and means for rigidly connecting said sprocket-segments and cranks.

3. A combined wheeled dumping scraper and grader having a bisected pan fastened to a containing-frame carrying a scraper or cutter, a spring-pressed lever fulcrumed to the axle of the machine and having a link connection with the forward portion of the pan, a shaft journaled on the beam or pole of the machine forward of and parallel to said axle, crank-levers fixed to each end of said shaft and connected with the pan-frame, a spring-pressed lever rigidly fastened to said shaft, a notched curved rack engaging with a lug on said lever, a brace-bar connecting at its apex with a hook bolted near the forward end of the beam or pole of the machine and pivotally connected at its ends with the forward ends of the pan-frame, sprocket-segments at each end of said shaft having lugs near their rear ends, sprocket-wheels on the axle in line with the said segments, chains fastened to the rear ends of said pan-frame and passing over and engaging the teeth of said sprocket segments and wheels, a spring-controlled handle-bar or lever fulcrumed to said shaft and engaged with a notched curved rack, cranks and links connecting with the shaft and the forward ends of the pan-frame, a pin-and-hole connection between the cranks and links for adjustably connecting them together, braces extending from the beam or pole of the machine to the axle-cranks provided with stops with which the lugs on the sprocket-segments may contact, and guide-bars on the axle-cranks extending below the top of the pan-frame, to prevent side motion thereof.

4. A dumping scraper and grader consisting of a two-part pan, a frame suspended from the axle of bearing-wheels, hinges by which the two parts of the pan are suspended from said frame and about which they are turnable, lever-arms having their lower ends fixed to the two parts of the pan and their upper ends pivotally united at one side of the pan, a lever fulcrumed upon the machine having a link connecting with the forward edge of one of the pans whereby the movement of the lever acts to separate the pans and dump the load.

5. In a compound grader and scraper, a frame having a share or cutter at the front and a receiving and dumping pan behind said share, a crank-axle to the end of which bearing-wheels are journaled, sprocket-wheels turnable upon said shaft, chains connecting with the rear end of the scraper-frame passing over the sprocket-wheel, segments loosely turnable upon a shaft fixed in front of the main axle and having attachments whereby the chains may be connected therewith so that the turning of the sprockets will raise or depress the rear end of the scraper, movable latches fixed to the sprocket-segments and stops upon the segment-shaft crank-arms with which the latches are engaged when the segments are turned to raise the rear end of the scraper, crank-arms upon the shaft on which the segments are turnable and links connecting said crank-arms with the front of the scraper and a latch-lever and segmental rack for holding the same whereby the shaft may be turned independently of the sprockets to regulate the height of the front end of the scraper.

In witness whereof I have hereunto set my hand.

WALTER C. BRADFORD.

Witnesses:
E. C. HAFNER,
E. P. WILLARD.